UNITED STATES PATENT OFFICE.

SEWARD F. GRAY, OF TITUSVILLE, FLORIDA.

PROCESS OF PRODUCING TANNING AGENTS FROM THE SAW-PALMETTO.

SPECIFICATION forming part of Letters Patent No. 703,058, dated June 24, 1902.

Application filed February 15, 1901. Serial No. 47,512. (No specimens.)

*To all whom it may concern:*

Be it known that I, SEWARD F. GRAY, a citizen of the United States of America, and a resident of Titusville, Brevard county, Florida, have invented certain new and useful Improvements in Processes of Producing Tanning Agents from the Saw-Palmetto, of which the following is a specification.

I find after repeated experiments extending over a number of years that the usual methods employed for extracting tannin and coloring-matter from the canaigre-plant, mayweed, oak and hemlock barks, &c., cannot be successfully used on the saw-palmetto. Probably oak and hemlock barks have been more generally used than anything else for obtaining tannin, and the process used has been a leaching process. I have found after experimenting a number of years that the saw-palmetto roots contain a large amount of starchy and gummy or resinous substances and ash and that the water used in the leaching process seems to seal up the cells in the roots and confine, rather than free, the tannin, even though the roots be cut as fine as sawdust and large quantities of water used. I find that only a very weak liquor results, requiring a great amount of evaporation, and that the whole process is long, expensive, and ineffectual. The extract which I obtained from the saw-palmetto roots by the ordinary leaching process in every instance showed a deposit of sediment varying from one-sixteenth of an inch to almost fifty per cent. of the extract, which with age became insoluble. Further, owing to the large percentage of non-tannins in the palmetto-roots fermentation easily takes place, and it is practically impossible to get a sweet liquor of required density and tannin for concentration. Owing to the fermentation, the extracts seem to undergo a chemical change, which caused a great precipitation, carrying down or destroying the tannin to the great detriment of the extract, making it practically worthless for coloring or dyeing purposes. The general results of my experiments with the old leaching processes showed that the yield of tannin was small, quality of the extract inferior, that the extract deteriorates with age, and, in short, is unfit for commercial purposes, while the process is expensive, lenghty, and laborious. By my present invention I greatly reduce the consumption of steam, fuel, and water, thus reducing the expense of the process to a very considerable extent, and I obtain an extract which is substantially clear and free from sediment, contains a large proportion of tannin and less non-tannins, will keep better, and is in every way a more desirable commodity, more stable as a tanning agent, and more effectual for coloring or dyeing purposes. Moreover, it provides, as I believe, the first commercially practical way for extracting the tannin and coloring-matter from the roots of the saw-palmetto.

In practicing my invention I use roots of the saw-palmetto, which are white at the new growth nearest the leaves and red where the growth is old. I prefer to separate the white and red roots and treat them separately. These roots are freed from dirt and passed through crushing-rolls or subjected to hydraulic or other pressure for the purpose of squeezing out the juice. The juices obtained from the squeezing or crushing process are immediately run into storage-tanks and allowed to settle for a few hours, care being taken that they do not stand long enough for substantial fermentation to set in. They are then racked off and concentrated to about 50° Twaddell in a vacuum or partial vacuum—*i. e.*, under diminished pressure—thus forming the extract at a temperature of about 120° to 140° Fahrenheit. The settlings in the storage-tank and the crushing roots may be treated by the leaching process and the liquor concentrated; but I have found it is generally not worth while to go to the expense of these operations, inasmuch as the extract obtained thereby is not worth the cost of the process.

The product of my new process above described has the following characteristics—*i. e.*, it will not deposit any substantial sediment on standing, as the ordinary wood extracts do, but remains clear for at least many months. It does not substantially deteriorate in tannin with age. When dyed with mordants, it yields the following results on cotton: with alum, brown; with iron-acetate, blue; with copperas, gray; with chrome, brown.

I claim as my invention—

1. The herein-described process of producing a tanning agent by extracting tannin from the roots of the saw-palmetto, which consists in, first, cleansing the roots; second, squeezing the juices out of the roots alone; third, settling said juices until the precipitates are separated from the clear portion; fourth, racking off said clear portion, and, fifth, concentrating this portion *in vacuo*.

2. The herein-described process of producing a tanning agent by extracting tannin from the roots only of the saw-palmetto, which consists in, first, separating the white from the red parts of the roots; secondly, separately squeezing the juices out of the respective colored roots; thirdly, allowing said juices to settle until the precipitates are separated from the clear portion; fourthly, racking off said clear portion, and, fifthly, allowing the said racked-off portion to concentrate *in vacuo* under diminished pressure.

SEWARD F. GRAY.

Witnesses:
C. S. SCHUYLER,
W. S. BRANNING.